(12) United States Patent
Mimura et al.

(10) Patent No.: US 6,568,817 B1
(45) Date of Patent: May 27, 2003

(54) RETROREFLECTING SHEET HAVING PRINTED LAYER

(75) Inventors: Ikuo Mimura, Toyama (JP); Akihiro Matsuda, Toyama (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 53 days.

(21) Appl. No.: 10/009,257

(22) PCT Filed: Apr. 6, 2001

(86) PCT No.: PCT/JP01/02996

§ 371 (c)(1),
(2), (4) Date: Dec. 10, 2001

(87) PCT Pub. No.: WO01/77721

PCT Pub. Date: Oct. 18, 2001

(30) Foreign Application Priority Data

Apr. 10, 2000 (JP) ........................................ 2000-108636

(51) Int. Cl.$^7$ .............................................. G02B 5/124
(52) U.S. Cl. ........................ 359/530; 350/531; 350/527; 350/528
(58) Field of Search ................................. 359/530, 531, 359/527, 528, 529, 533, 831, 833, 834, 546, 900; 428/40, 141, 156, 167, 168, 172, 323, 352, 535; 156/209, 278, 276, 289

(56) References Cited

U.S. PATENT DOCUMENTS

| | | | |
|---|---|---|---|
| 3,417,959 A | 12/1968 | Schultz | |
| 3,712,706 A | 1/1973 | Stamm | |
| 5,213,872 A | 5/1993 | Pricone et al. | |
| 5,310,436 A | * 5/1994 | Pricone et al. | ............... 156/209 |
| 5,344,705 A | * 9/1994 | Olsen | ......................... 428/195 |
| 5,376,431 A | 12/1994 | Rowland | |
| 5,754,338 A | * 5/1998 | Wilson et al. | ............... 359/529 |
| 6,083,607 A | 7/2000 | Mimura et al. | |
| 6,139,158 A | * 10/2000 | Nilsen et al. | ................ 359/515 |
| 6,406,798 B2 | * 6/2002 | White et al. | ................. 428/522 |

FOREIGN PATENT DOCUMENTS

| | | |
|---|---|---|
| JP | 49-106839 | 10/1974 |
| JP | 6-214103 | 8/1994 |
| JP | 11-183715 | 7/1999 |
| JP | 11-30518 | 11/1999 |
| WO | 98/18028 | 4/1998 |
| WO | 01/77721 A1 | 10/2001 |

* cited by examiner

Primary Examiner—Mohammad Sikder
(74) Attorney, Agent, or Firm—Young & Thompson

(57) ABSTRACT

Retroreflective sheeting comprising at least a reflective element layer made up of a large number of reflective elements and a holding body layer and a surface protective layer provided on the reflective element layer, wherein a printed layer is provided on the lateral faces of the reflective elements or between the holding body layer and the surface protective layer or on the surface protective layer, the printed layer being formed of a discrete repetitive pattern of unit patterns, and the unit patterns each having an area of 0.15 mm$^2$ to 30 mm$^2$.

10 Claims, 11 Drawing Sheets

RETROREFLECTING SHEET HAVING PRINTED LAYER

TECHNICAL FIELD

The present invention relates to retroreflective sheeting having a printed layer, particularly a triangular cube-corner retroreflective sheeting constituted of triangular cube-corner retroreflective elements (hereinafter also referred to simply as triangular reflective elements) which is characterized by having a printed layer for tone improvement in a part thereof and is useful for signs such as road signs and construction signs; license plates of vehicles such as automobiles and motorcycles; safety equipment such as garments and life-saving equipment; markings of signboards; and reflectors such as visible light, laser light or infrared light reflective sensors; and the like.

BACKGROUND ART

Retroreflective sheeting which reflects incident light toward the light source has been well known. The sheeting having such retroreflective properties has been used widely in the above-described fields. In particular, cube-corner retroreflective sheeting making use of the retroreflection theory of cube-corner retroreflective elements such as triangular reflective elements and triangular cube-corner retroreflective sheeting having a vapor-deposition layer on the lateral faces of the triangular reflective elements thereof (hereinafter referred to as vapor-deposited triangular cube-corner retroreflective sheeting) are extremely superior in retroreflectivity to conventional retroreflective sheetings using micro glass beads and have been extending their use year by year because of their excellent retroreflective performance.

Such retroreflective sheetings and processes for producing them are described, e.g., in U.S. Pat. No. 3,417,959 and WO98/18028 as to triangular cube-corner retroreflective sheeting, and JP-A-49-106839 (U.S. Pat. No. 3,712,706) as to vapor-deposited triangular cube-corner retroreflective sheeting.

Vapor-deposited triangular cube-corner retroreflective sheeting has a disadvantage attributed to its retroreflective elements that the appearance is darkened by the influence of the metal color.

In order to improve the hue of the triangular cube-corner retroreflective sheeting and the vapor-deposited triangular cube-corner retroreflective sheeting, it has been attempted to provide a continuous printed layer in part of the retroreflective sheeting.

However, because a printed layer has slightly poor adhesion to both the reflective element layer and a surface protective layer and also has poor weatherability, it is liable to suffer lifting in a weathering test. It also has a disadvantage of easily absorbing water. Where a continuous printed layer is provided in a triangular cube-corner retroreflective sheeting or a vapor-deposited triangular cube-corner retroreflective sheeting, the sheeting has poor adhesion around the printed layer and poor weather resistance or water resistance.

In addition to the above-described triangular cube-corner retroreflective sheeting and vapor-deposited retroreflective sheeting, retroreflective sheetings include those using micro glass beads, such as encapsulated retroreflective sheeting and encapsulated lens retroreflective sheeting.

The encapsulated retroreflective sheeting comprises a light-transmitting support layer, a microbead layer provided opposite to the light incident side of the light-transmitting support layer in which a large number of micro glass beads are arrayed substantially in a monolayer with their almost semi-spherical portions being embedded, a light-transmitting focusing layer which is formed along the surface of the other non-embedded semi-spherical portions of the micro glass beads and has such a thickness that the micro glass beads may substantially focus on the surface of the focusing layer that is not in contact with the micro glass beads, and a light-reflective metal film which is formed on the surface of the focusing layer that is not in contact with the micro glass beads. If necessary, the sheeting can have a light-transmitting surface protective layer superposed on the surface of the light-incident side of the support layer.

The encapsulated lens retroreflective sheeting comprises a light-transmitting coating layer, a support layer, a lens retroreflective element layer provided on the surface of the support layer which faces the light-transmitting coating layer in which a large number of micro glass beads are arrayed substantially in a monolayer with their almost semi-spherical portions being embedded and with the embedded semi-spherical portions being coated with a light-reflective metal film, and an air layer provided between the light-transmitting coating layer and the lens retroreflective elements. The air layer is formed by partly connecting the light-transmitting coating layer and the support layer via joints such that gaps are formed between these layers, and the air layer is partitioned by the joints into a large number of closed small vacant spaces.

The encapsulated retroreflective sheeting and the encapsulated lens retroreflective sheeting essentially have lower retroreflective performance than the triangular cube-corner retroreflective sheeting or the vapor-deposited triangular cube-corner retroreflective sheeting. Therefore, where a printed layer is provided, they are incapable of satisfying the requirement for retroreflective performance.

DISCLOSURE OF THE INVENTION

In the light of the disadvantages of the conventional techniques, the present invention provides retroreflective sheeting with an improved hue by a very simple and inexpensive method.

The inventors of the present invention have conducted extensive investigation on hues of triangular cube-corner retroreflective sheeting or vapor-deposited triangular retroreflective sheeting. As a result, they have found that disposing a specific printed layer on the reflective element layer or the surface protective layer of the retroreflective sheeting provides retroreflective sheeting with excellent weather resistance and water resistance and an improved hue and thus have completed the present invention.

The present invention provides retroreflective sheeting having a printed layer which comprises at least a reflective element layer made up of a large number of reflective elements and a holding body layer and a surface protective layer provided on the reflective element layer, which is characterized in that the printed layer is provided in the lateral faces of the reflective elements or between the holding body layer and the surface protective layer or on the surface protective layer, the printed layer is formed of a discrete repetitive pattern of unit patterns, and the unit patterns each have an area of 0.15 mm$^2$ to 30 mm$^2$.

BEST MODE FOR CARRYING OUT THE INVENTION

The retroreflective sheeting having a printed layer according to the present invention will be described in detail with reference to the drawings.

The retroreflective sheeting of the present invention is preferably a triangular cube-corner retroreflective sheeting or vapor-deposited triangular cube-corner retroreflective sheeting each having at least a reflective element layer made up of a large number of reflective elements and a holding body layer and a surface protective layer provided on the reflective element layer. Retroreflective sheetings of these kinds exhibit particularly excellent retroreflective performance so that sufficient retroreflectivity can be obtained even in the presence of a printed layer.

The reflective element layer made up of a large number of reflective elements and a holding body layer can be of the type known as a reflective element layer of triangular cube-corner retroreflective sheeting or vapor-deposited triangular cube-corner retroreflective sheeting.

Figure 1:
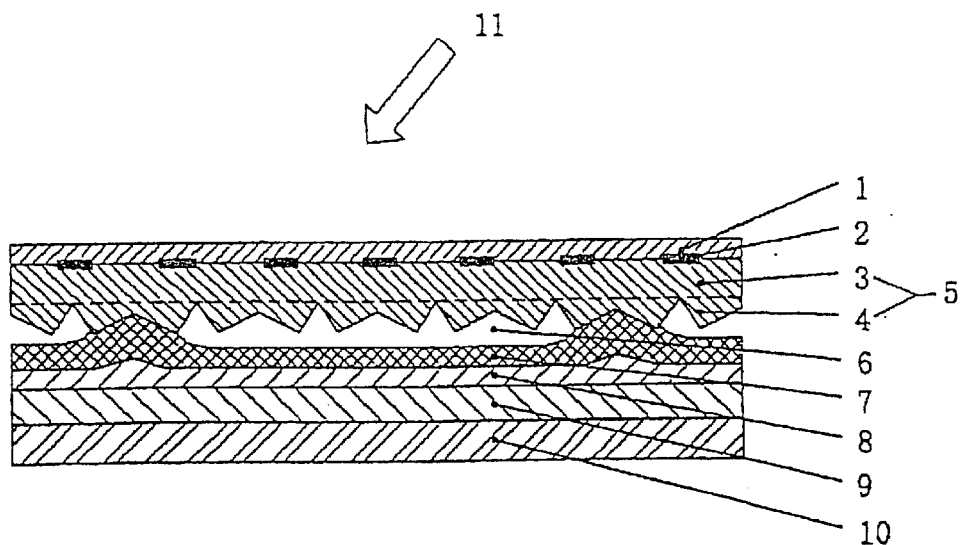
FIG. 1 is a cross-section of an example of the triangular cube-corner retroreflective sheeting according to the present invention, in which a printed layer is provided between a holding body layer and a surface protective layer.

An example of the triangular cube-corner retroreflective sheeting according to the present invention will be described by referring to FIG. 1. FIG. 1 is a cross-section of an example of the triangular cube-corner retroreflective sheeting according to the present invention, in which a printed layer is provided between a holding body layer and a surface protective layer.

In FIG. 1 numeral (1) indicates a surface protective layer; (2) a printed layer for coloring for hue adjustment; (5) a reflective element layer having triangular reflective elements (4) arrayed in a closest-packed configuration; and (3) a holding body layer which holds the reflective elements (4). Arrow (11) shows the direction of incident light. The reflective elements (4) and the holding body layer (3) which constitute the reflective element layer (5) are generally formed by integral molding but may be molded separately and joined together. According to the intended use and the environment of use of the retroreflective sheeting of the present invention, it can further comprise a binder layer (7) making a sealed structure for preventing water from penetrating to the back of the reflective element layer (5), a support layer (8) supporting the binder layer (7), an adhesive layer (9) for sticking the retroreflective sheeting to an adherent structure, and a releasable sheet (10).

As shown in FIG. 1, the triangular cube-corner retroreflective sheeting usually has an air layer (6) on the back of the triangular cube-corner retroreflective elements to increase the critical angle for total internal reflection of the reflective element layer (5).

In order to avoid such problems as a reduction in critical angle due to water penetration under conditions of use, it is preferred that the reflective element layer (5) and the support layer (8) be sealed by the binder layer (7).

The sealing can be carried out by the methods described in U.S. Pat. Nos. 3,190,178 and 4,025,159, JP-A-U-50-28669, etc.

The printed layer (2) is provided on the lateral faces of the reflective elements (4) or between the holding body layer (3) and the surface protective layer (1) or on the surface protective layer (1). Where the surface protective layer (1) is composed of two or more layers, the printed layer (2) can be provided between the protective layers.

The printed layer (2) can be usually provided by the methods of gravure printing, screen printing, ink jet printing and the like.

Printed areas of the printed layer (2) should be discrete. For example, it is formed of a repetitive pattern of discrete unit patterns as shown in FIGS. 4 or 5.

Figure 4:
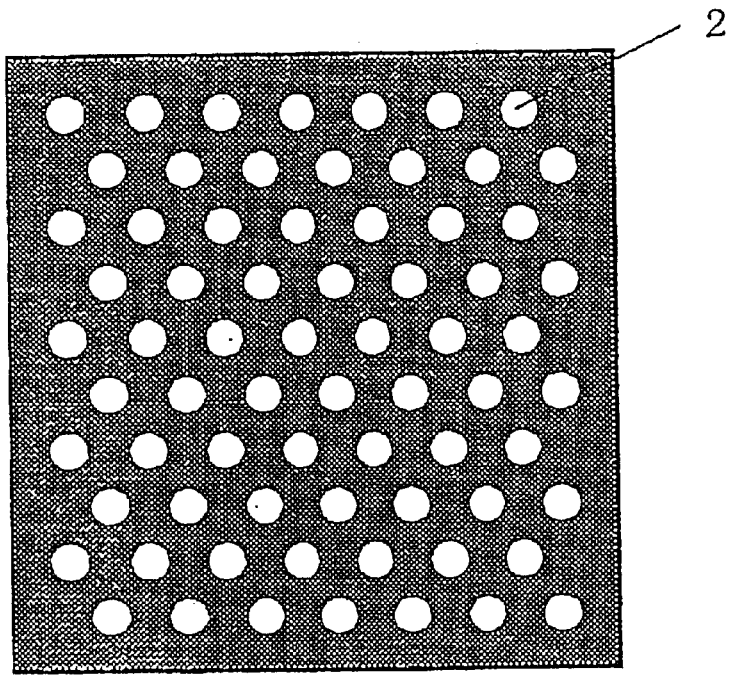
FIG. 4 is a plan view showing an example of printed pattern units and their configurations in a printed layer used in the present invention.
Figure 5:
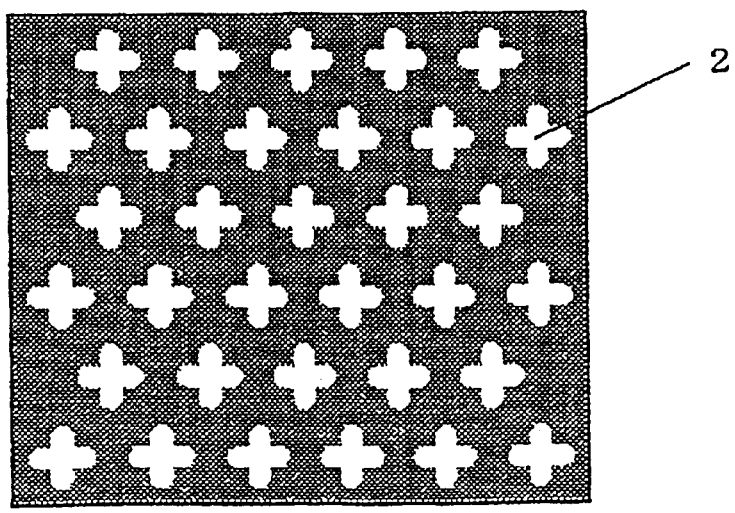
FIG. 5 is a plan view showing another example of printed pattern units and their configurations in a printed layer used in the present invention.

The unit patterns are not limited to those illustrated in FIGS. 4 and 5 and include figures, such as ellipses, squares and rectangles, geometric patterns composed of straight lines or curved lines, letters, symbols, and combinations of two or more of these units.

The unit pattern has an area of 0.15 mm$^2$ to 30 mm$^2$, preferably 0.2 mm$^2$ to 25 mm$^2$, still preferably 0.4 mm$^2$ to 15 mm$^2$.

A unit pattern area of 0.15 mm$^2$ or more secures excellent pattern formability and facilitates hue control. A unit pattern area of 30 mm$^2$ or less does not cause a reduction in adhesion strength between two layers around the areas having the printed layer (2) therebetween.

While the unit patterns can be arranged at any intervals as long as each unit pattern forms an independent area, they are preferably arranged so that non-printed areas among them may have a minimum width of 0.2 mm to 200 mm, particularly 0.5 mm to 50 mm.

The printed layer (2) preferably has a total printed area of 2% to 70%, particularly 5% to 40%, based on the area of the surface layer of the retroreflective sheeting.

The thickness of the printed layer (2) is preferably, but is not limited to, 0.5 to 10 $\mu$m, still preferably 1 to 5 $\mu$m, particularly preferably 2 to 4 $\mu$m. With a thickness of 0.5 $\mu$m or greater, excellent formability of the printed layer (2) is secured, and hue control is easy. With a thickness of 10 $\mu$m or smaller, the printed layer (2) does not cause a reduction in adhesion strength between two layers around the areas having the printed layer (2) therebetween.

Ink for forming the printed layer (2) comprises a resin component and a colorant and, if desired, various additives, such as a plasticizer, an antifoaming agent, a leveling agent, an ultraviolet absorber, a light stabilizer, a heat stabilizer, and a crosslinking agent. It can further contain a solvent for viscosity adjustment or a like purpose.

The resin component which can be used in the ink preferably includes, but is not limited to, melamine resins, epoxy resins, urethane resins, vinyl resins, polyester resins and alkyd resins, which are excellent in dispersing properties for colorants, dispersion stability, dissolving properties for solvents, weather resistance, printability, adhesion to films, and the like. They can be used either individually or in the form of a copolymer of two or more thereof.

Where the surface protective layer (1) is made of a vinyl chloride resin or a (meth)acrylic resin, preferred among the above-recited resin components for the ink are an acrylic resin, a vinyl resin or a copolymer thereof.

While not limiting, the colorant used in the ink is preferably such that the hue is brightened and that hiding properties are obtained. Light colors matching the sheeting's hue are preferred. For example, white organic pigments, white or yellow inorganic pigments, fluorescent dyes or fluorescent whitening agents are useful. White or yellow inorganic pigments are particularly preferred for their excellent hiding properties.

The organic pigments include Fast Yellow, Disazo Yellow, Permanent Yellow, Lionol Yellow, Chromophthal Yellow, and Irgazin Yellow. They can be used either individually or as a combination thereof.

The inorganic pigments include white ones, such as titanium oxide, calcium carbonate, barium sulfate, zinc oxide, and zinc sulfide; and yellow ones, such as titanium yellow, and yellow iron oxide. They can be used either individually or as a combination thereof or in combination with the above-described organic pigments.

Materials for forming the reflective elements (4) and the holding body layer (3) are not particularly limited as far as flexibility, one of the objects of the present invention, is secured. Materials having optical transparency and uniformity are preferred.

Materials which can be used to form the reflective elements (4) include polycarbonate resins, vinyl chloride resins, (meth)acrylic resins, epoxy resins, styrene resins, polyester resins, fluorine resins, olefin resins such as polyethylene resins and polypropylene resins, cellulosic resins, and urethane resins. Ultraviolet absorbers, light stabilizers, antioxidants, etc. can be used either individually or as a combination thereof to improve weather resistance. Further, various organic pigments, inorganic pigments, fluorescent pigments, dyes, fluorescent dyes, and so forth can be incorporated as colorants.

Materials for making the surface protective layer (1) include those described above as being useful to make the reflective elements (4). In particular, vinyl chloride resins and (meth)acrylic resins which are excellent in weather resistance, solvent resistance, printability and the like are preferred. Ultraviolet absorbers, light stabilizers, antioxidants, etc. may also be incorporated into the surface protective layer (1) either individually or as a combination to, improve weather resistance. Further, various organic pigments, inorganic pigments, fluorescent pigments, dyes, fluorescent dyes, and the like may also be incorporated as colorants.

Where the printed layer (2) is printed on the surface protective layer (1), the surface tension of the surface protective layer (1) is preferably adjusted to 32 dyne/cm or more to have improved printability.

Resins which can be used in the binder layer (7) include (meth)acrylic resins, polyester resins, alkyd resins, and epoxy resins. For bonding, known methods such as a thermally fusible resin bonding method, a thermosetting resin bonding method, an ultraviolet-curing resin bonding method, and an electron radiation-curing resin bonding method, can be adopted.

The binder layer (7) can be applied either onto the entire surface of the support layer (8) or on selected areas to be joined with the reflective elements (4) by printing or a like method.

Materials which can form the support layer (8) include those recited above as usable for the reflective elements (4) and other general film-forming resins, fiber, fabric, and metal foils or plates of stainless steel, aluminum, etc. They can be used either individually or as a combination thereof.

The adhesive layer (9) which is used to stick the retroreflective sheeting of the present invention onto a metal plate, a wooden plate, a glass plate, a plastic plate, etc. and the releasable sheet (10) for the adhesive layer (9) are selected appropriately from those known. The adhesive is selected appropriately from pressure-sensitive adhesives, heat-sensitive adhesives, crosslinking adhesives, and the like. The pressure-sensitive adhesives include polyacrylic ester types prepared by copolymerizing an acrylic ester, e.g., butyl acrylate, 2-ethylhexyl acrylate, isooctyl acrylate or nonyl acrylate, with acrylic acid, vinyl acetate, etc.; silicone types, and rubber types. The heat-sensitive adhesives include acrylic types, polyester types, and epoxy resin types.

Figure 2:
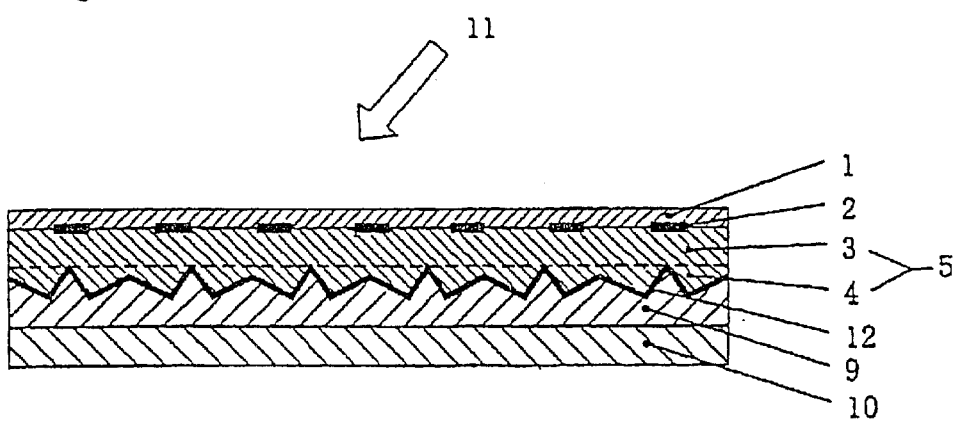
FIG. 2 is a cross-section of an example of the vapor-deposited triangular cube-corner retroreflective sheeting according to the present invention, in which a printed layer is provided between a holding body layer and a surface protective layer.
Figure 3:
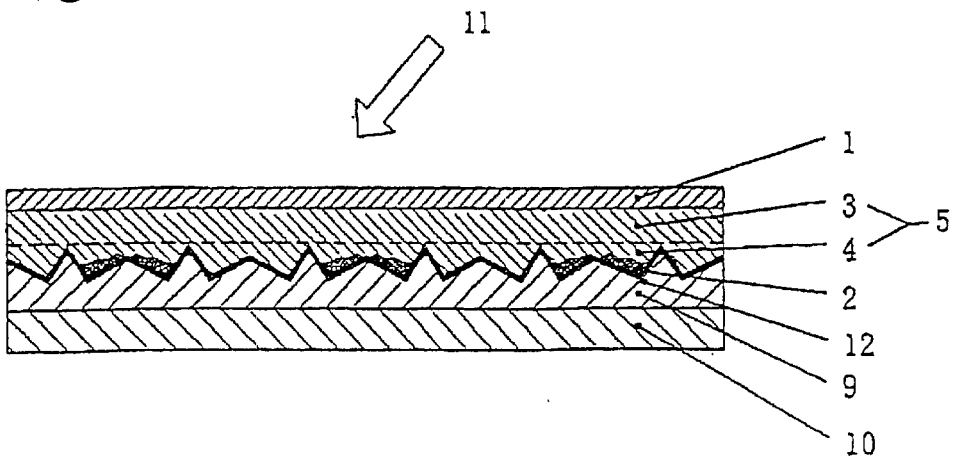
FIG. 3 is a cross-section of another example of the vapor-deposited triangular cube-corner retroreflective sheeting according to the present invention, in which a printed layer is provided on the lateral faces of reflective elements.

An example of the vapor-deposited triangular cube-corner retroreflective sheeting according to the present invention will then be described by referring to FIGS. 2 and 3. FIG. 2 is a cross-section of an example of the vapor-deposited triangular cube-corner retroreflective sheeting according to the present invention, in which a printed layer is provided between a holding body layer and a surface protective layer.

FIG. 3 is a cross-section of another example of the vapor-deposited triangular cube-corner retroreflective sheeting according to the present invention, in which a printed layer is provided on the lateral faces of reflective elements.

A surface protective layer (1), a printed layer (2), a holding body layer (3), reflective elements (4), a reflective element layer (5), an adhesive layer (9), and a releasable sheet (10) which constitute the vapor-deposited triangular cube-corner retroreflective sheeting can be the same as those used in the above-mentioned triangular cube-corner retroreflective sheeting.

The vapor-deposited triangular cube-corner retroreflective sheeting has a metallic mirror-reflection layer (12) deposited on the lateral faces of the reflective elements (4). It has the adhesive layer (9) in direct contact with the mirror-reflection layer (12). Since the vapor-deposited triangular cube-corner retroreflective sheeting according to this embodiment achieves retroreflection through the mirror reflection theory, an air layer is not needed. As a result, neither a binder layer nor a support layer is required.

In the vapor-deposited triangular cube-corner retroreflective sheeting according as to the present invention, the mirror-reflection layer (12) made of a metal such as aluminum, copper, silver or nickel is deposited on the lateral faces of the reflective elements (4) by vacuum deposition, chemical plating, sputtering or a like technique. Of these techniques for depositing the mirror-reflection layer (12) vacuum deposition using aluminum is preferred; for the deposition temperature can be lowered to minimize thermal deformation of the reflective elements (4) during vapor deposition, and the resulting mirror-reflection layer (12) has a bright tone.

A continuous vapor deposition system for forming the aluminum mirror-reflection layer (12) comprises a vacuum chamber capable of keeping a vacuum degree of about 7 to $9 \times 10^{-4}$ mmHg, an unwinder for feeding prism stock sheeting made up of a substrate and a surface protective layer superposed on the light incident side of the substrate, the unwinder being set in the vacuum chamber, a winder for taking up the prism stock sheeting having a deposit layer thereon, and a heating unit disposed between the unwinder and the winder in which aluminum in a graphite crucible is melted by means of an electric heater. Pure aluminum pellets having a purity of 99.99% by weight or more are put into the graphite crucible. The aluminum is melted and vaporized under conditions of 350 to 360 V in alternating voltage, 115 to 120 Å in current and deposited on the surface of the reflective elements at a treating rate of 30 to 70 m/min to form the mirror-reflection layer (12) to a thickness, e.g., of 800 to 2000 Å.

The reflective elements (4) of the triangular cube-corner retroreflective sheeting and the vapor-deposited triangular cube-corner retroreflective sheeting according to the present invention preferably include the following triangular cube-corner retroreflective elements (1) and (2).

(1) Triangular cube-corner retroreflective elements having the configurations shown in FIGS. 11 through 21, wherein the triangular cube-corner retroreflective elements are pairs of triangular cube-corner retroreflective elements formed by V-shaped grooves having a substantially symmetrical cross-section and intersecting with each other so that the pairs project over a common bottom plane (S-S') and are arranged in a closest-packed configuration and that each element of each pair is contoured by three lateral faces (a1, b1 and c1; a2, b2 and c2; ...) which intersect with each other at approximately right angles, two lateral faces facing each other (c1 and c2) in each pair make a pair sharing a base (x), the bottom plane (S-S') is a common plane including both the base (z, z) of one of the other lateral faces (a1 or a2) and the base (y, y) of the other lateral faces (b1 or b2), the lateral faces (c1 and c2) facing each other and having the common base (x) in each pair have different shapes, and the elements of each pair have different heights from the bottom plane (S-S') to their respective apices.

(2) Triangular cube-corner retroreflective elements having the configuration shown in FIGS. 7 through 10, wherein pairs of triangular cube-corner retroreflective elements projecting over a common bottom plane (Sx-Sx') are arranged in a closest-packed configuration, each pair sharing a base on the common bottom plane (Sx-Sx'), the bottom plane (Sx-Sx') is a common plane including a large number of bases (x, x, ...) each shared by each pair of triangular reflective elements, the elements facing each other to make a pair have substantially the same contour and are substantially symmetrical about a plane (Lx-Lx', Lx-Lx', ...) perpendicular to the bottom plane (Sx-Sx'), each pair of the triangular reflective elements are formed of slant lateral faces (c1 and c2) which have substantially the same pentagonal shape and share the common base (x, x, ...) as one side of the pentagonal shape and slant lateral faces (a1 and b1) and (a2 and b2) which have substantially the same quadrilateral shape each formed of one of the upper two sides of the face c1 or c2 including the apex (H1 or H2) of each triangular reflective element, share one lateral edge of each element as another side, and intersect with the face c1 or c2 at substantially right angles, and the height (h') from the apex (H1 or H2) of every triangular reflective element to the bottom plane (Sx-Sx') including the bases (x, x, ...) of the pentagonal slant faces (c1 and c2) is substantially larger than the height (h) from the apex (H1 or H2) of every triangular reflective element to a substantially horizontal plane (imaginary plane; S-S') including the bases (y and z) of the other slant faces (a1and b1) and (a2, and b2).

Sheeting having the triangular cube-corner retroreflective elements (2) is described in WO98/18028, which is referred to for the details.

The triangular cube-corner retroreflective elements (1) shown in FIGS. 11 to 21 are described below in greater detail. The triangular cube-corner retroreflective elements of the embodiment shown in FIGS. 11 to 14 are described first.

Figure 11:
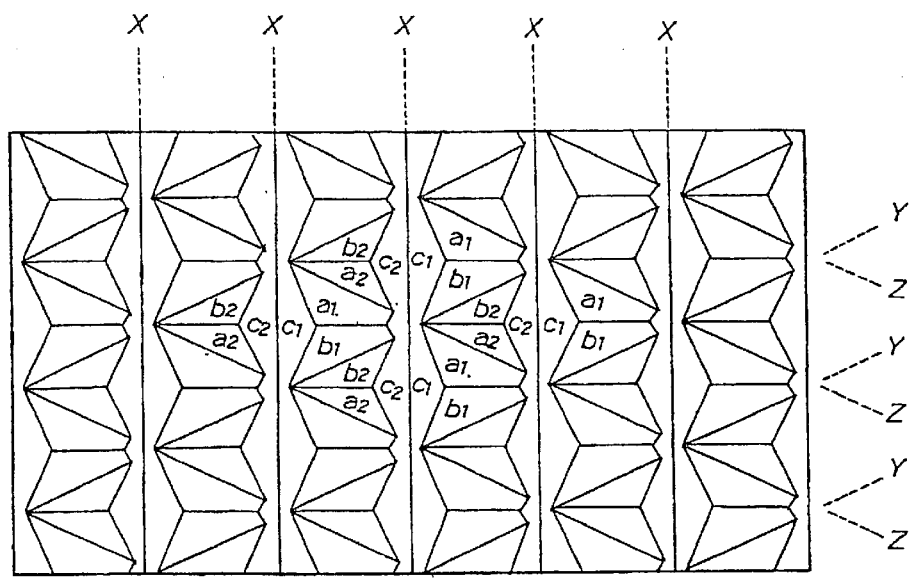
FIG. 11 is a plan view of an example of a group of triangular cube-corner retroreflective elements used in the present invention.

As shown in FIG. 11, V-shaped grooves having a substantially symmetrical cross-section intersect with each other so that pairs of triangular cube-corner retroreflective elements projecting over a common bottom plane (S-S') are arranged in a closest-packed configuration, each element of each pair being contoured by three lateral faces (a1, b1 and c1; a2, b2 and c2; ...) which intersect with each other at approximately right angles. In each pair of the triangular retroreflective elements, two lateral faces facing each other (faces c1 and c2) make a pair sharing a base (x). The bottom plane (S-S') is a common plane including both the base (z, z) of one of the lateral faces (a1 or a2) and the base (y, y) of the other lateral faces (b1 or b2). In each pair of the triangular retroreflective elements sharing the base (x), the lateral faces (c1 and c2) which face each other have different shapes, and the heights (hx1 and hx2) from the bottom plane (S-S') to each apex are different.

Figure 12:
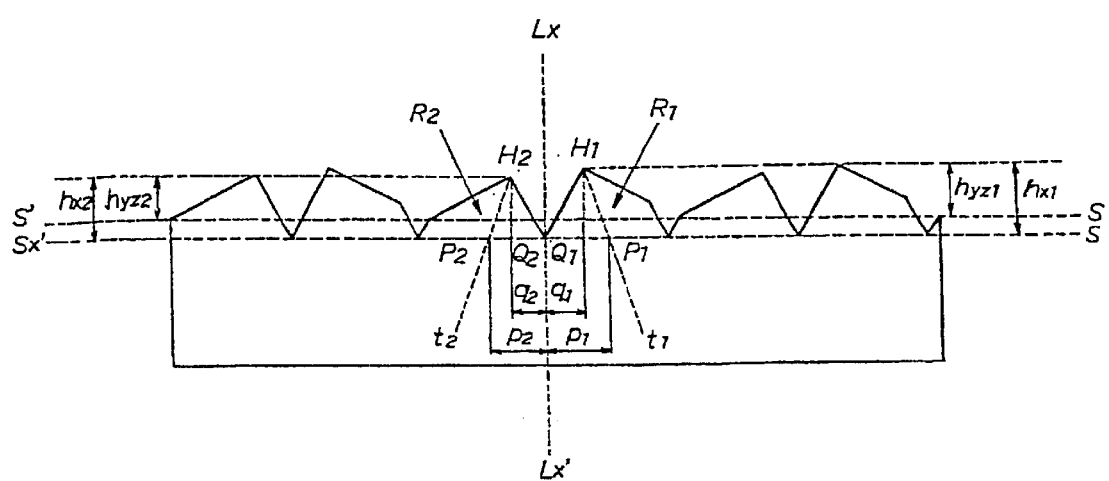
FIG. 12 is a side view of the group of triangular cube-corner retroreflective elements shown in FIG. 11.

As shown in FIG. 12, the height from a bottom plane (Sx-Sx') including the bases (x, x, ...) shared by facing lateral faces (c1 and c2) in a large number of pairs of the triangular retroreflective elements (R1 and R2) to the apex (H1), being taken as hx1, is larger than the height from the bottom plane (S-S') including the bases (z, z, . . . ) of one of the lateral faces (a1 and a2) of the paired triangular retroreflective elements and the bases (y, y, . . . ) of the other lateral faces (b1 and b2) to the apex (H1), being taken as hyz1, and the height hx1 from the bottom plane (Sx-Sx') to the apex (H1) is larger than the height hx2 from the bottom plane (Sx-Sx') to the apex (H2). In this case, the V-shaped grooves forming the bases (x) are preferably made deeper than the V-shaped grooves forming the other bases (y and z) so that the height ratio hx1/hyz1 may range from 1.05 to 1.5.

Figure 13:
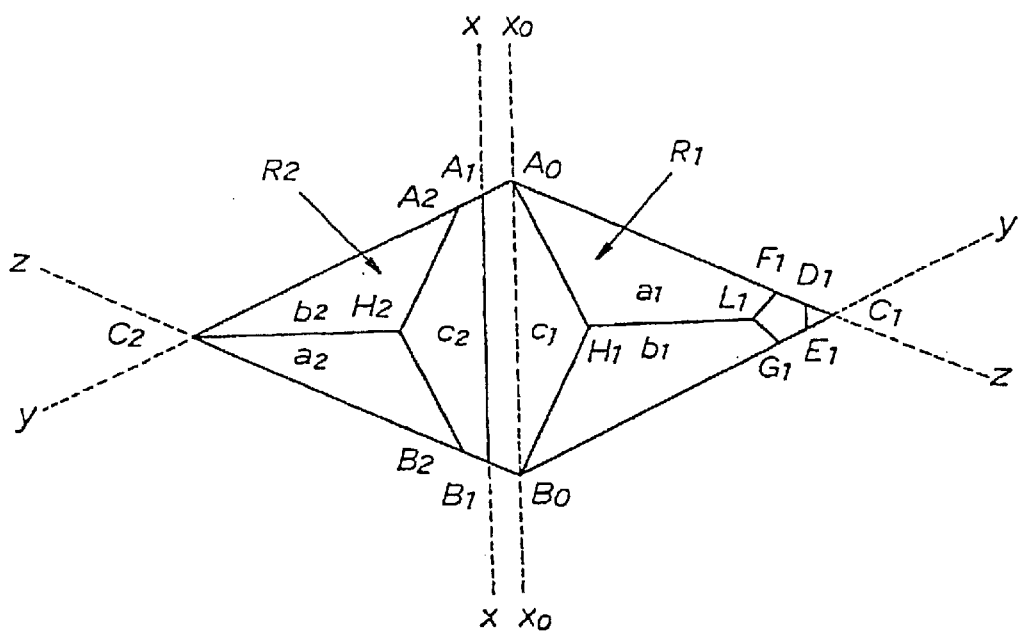
FIG. 13 is an enlarged plan view of a pair of reflective elements out of the group of triangular cube-corner retroreflective elements shown in FIG. 11.
Figure 14:
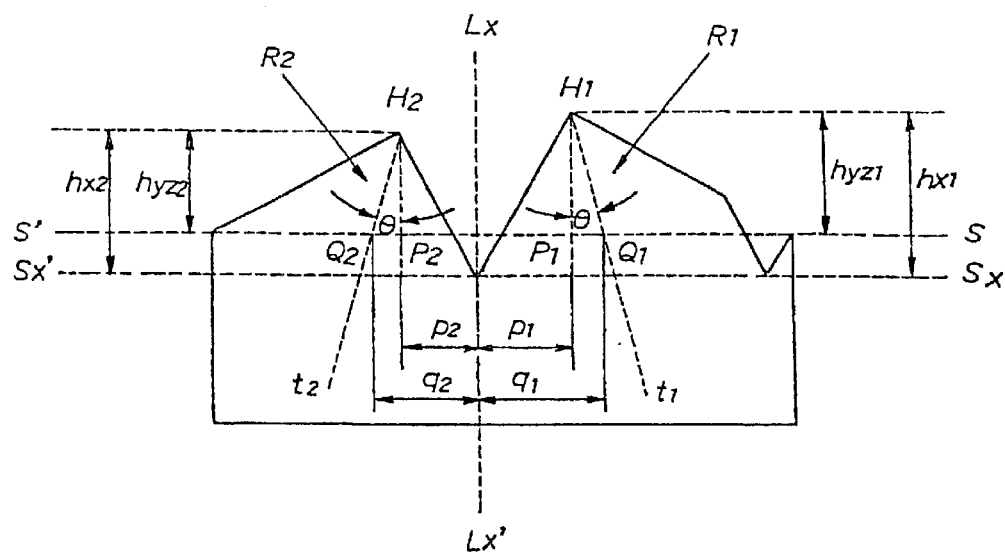
FIG. 14 is a side view of the pair of reflective elements shown in FIG. 13.

As shown in FIGS. 13 and 14, V-shaped grooves having a substantially symmetrical cross-section intersect with each other to form pairs of triangular cube-corner retroreflective elements, each element of each pair being contoured by three lateral faces (a1, b1 and c1; a2, b2 and c2; . . . ) which intersect with each other at approximately right angles, wherein the paired elements in each pair are substantially similar in optical geometry such that their respective optical axes make substantially the same angle ($\theta$) with the vertical in 180° different directions.

As is apparent from FIGS. 13 and 14, the pair of triangular cube-corner retroreflective elements shown in these figures particularly have the following characteristics (1) and (2).
(1) The bottom plane (S-S') including the bases (z, z, . . . ) of faces a1 and a2 and the bases (y, y, . . . ) of faces b1 and b2 of the two retroreflective elements R1 and R2 and the bottom plane (Sx-Sx') including the base (x, x, . . . ) shared by the facing lateral faces c1 and c2 are not on the same level, the bottom plane (Sx-Sx') being deeper than the bottom plane (S-S').
(2) An offset is given to the position (x) of the V-shaped groove so that the facing faces c1 and c2 of the two retroreflective elements R1 and R2 may have different areas, the face c1 being larger in area than the face c2.

The paired triangular cube-corner retroreflective elements (R1 and R2) according to this embodiment have their optical axes tilted at substantially the same angle ($\theta$) but in directions 180° different. The tilting direction of the optical axis (t1) of one of the paired elements (R1) is such that subtracting a distance (p1) from a distance (q1), i.e., (q1-p1), gives a positive difference, wherein the distance (q1) is a distance from [an intersection (Q1) of the optical axis (t1) and the common bottom plane (S-S')] to [a plane (Lx-Lx') which is perpendicular to the common bottom plane (S-S') and includes the base (x) shared by the pair]; and the distance (p1) is a distance from [an intersection (P1) of the vertical from the apex (H1) of the element down to the common bottom plane (S-S') and the plane (S-S')] to [the vertical plane (Lx-Lx')]. Likewise, the tilting direction of the optical axis (t2) of the other element (R2), which is different in height from R1, is such that subtracting a distance (p2) from a distance (q2), i.e., (q2-p2), gives a positive difference, wherein the distance q2 is a distance from [an intersection (Q2) of the optical axis (t2) and the common bottom plane (S-S')] to [the plane (Lx-Lx') perpendicular to the common bottom plane (S-S') and including the base (x) shared by the pair]; and the distance (p2) is a distance from [an intersection (P2) of the vertical drawn from the apex (H2) of the element down to the common bottom plane (S-S') and the plane (S-S')] to [the vertical plane (Lx-Lx')]. The optical axes of these elements are tilted in 180° different directions at substantially the same angle ($\theta$).

Figure 15:
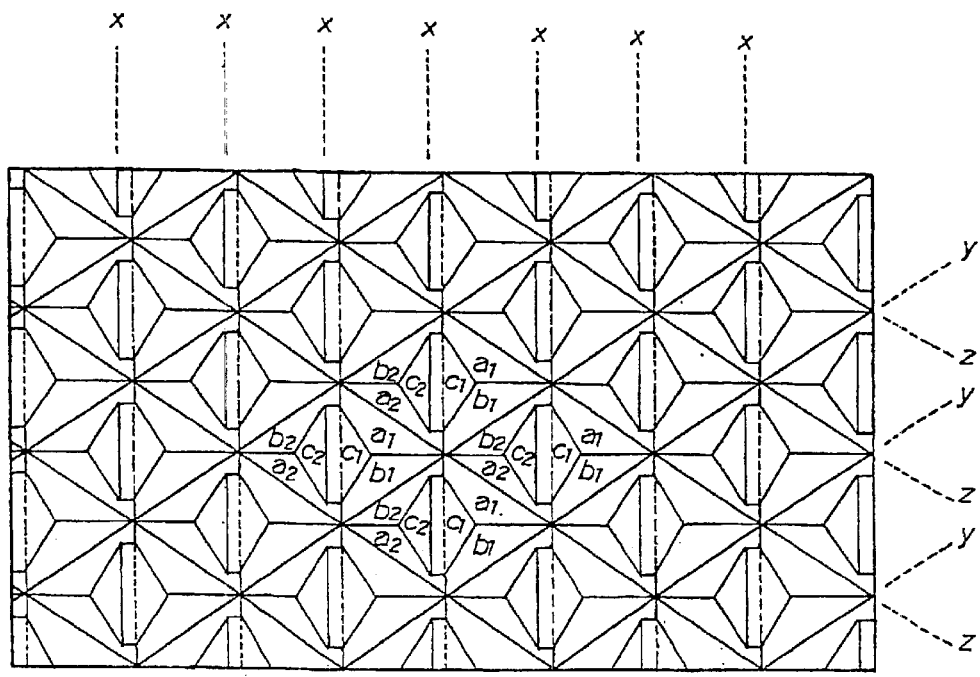
FIG. 15 is a plan view of another example of a group of triangular cube-corner retroreflective elements used in the present invention.
Figure 16:
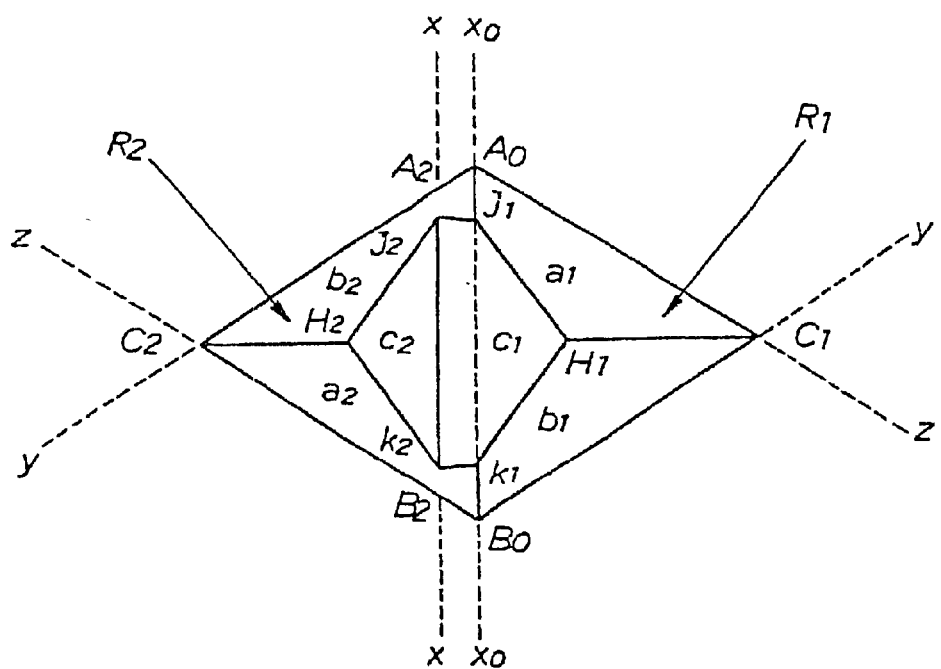
FIG. 16 is an enlarged plan view of a pair of reflective elements out of the group of triangular cube-corner retroreflective elements shown in FIG. 15.
Figure 17:
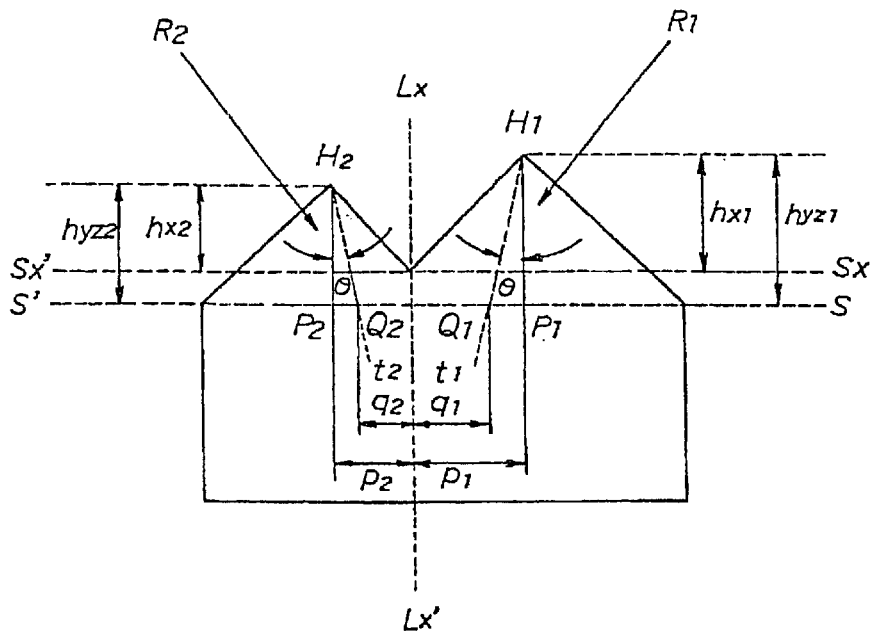
FIG. 17 is a side view of the pair of reflective elements shown in FIG. 16.

The triangular cube-corner retroreflective elements according the embodiment shown in FIGS. 15 to 17 are then described.

In the triangular cube-corner retroreflective elements according to the embodiment shown in FIGS. 15 through 17, V-shaped grooves having a substantially symmetrical cross-section intersect with each other to form pairs of triangular cube-corner retroreflective elements, each element of each pair being contoured by three lateral faces (a1, b1 and c1; a2, b2 and c2; . . . ) which intersect with each other at approximately right angles, wherein the lateral faces (c1 and c2) which face each other in each pair have different shapes, and the elements of each pair have different heights (hx1 and hx2) from a common bottom plane (S-S') including the bases (z, z) of one of the lateral faces (a1 and a2) and the bases (y, y) of the other lateral faces (b1 and b2) of the paired triangular retroreflective elements to their respective apices (H1 and H2).

As shown in FIG. 17, the height from a bottom plane (Sx-Sx') including the bases (x, x, ) each shared by facing lateral faces (C1 and C2) in a pair of the triangular retroreflective elements (R1 and R2) to the apex (H1), being taken as hx1, is smaller than the height from the bottom plane (S-S') including the bases (z, z) of one of the lateral faces (a1 and a2) and the bases (y, y) of the other lateral faces (b1 and b2) of the paired triangular retroreflective elements to the apex (H1), being taken as hyz1, and the height hx1 from the common bottom plane (Sx-Sx') to the apex (H1) is larger than the height hx2 of the other apex (H2). In this case, the V-shaped grooves forming the bases (x) are preferably made shallower than the V-shaped grooves forming the other bases (y and z) so that the height ratio hx1/hyz1 may range from 0.67 to 0.95.

As shown in FIG. 16, V-shaped grooves having a substantially symmetrical cross-section intersect with each other to form pairs of triangular cube-corner retroreflective elements, each element of each pair being contoured by three lateral faces (a1, b1 and c1; a2, b2 and c2; . . . ) which intersect with each other at approximately right angles. The paired elements in each pair are substantially similar in optical geometry such that their respective optical axes make substantially the same angle ($\theta$) with the vertical in 180° different directions.

In each pair of the triangular retroreflective elements (R1 and R2), while two bases (y and z) other than the common base (x) shared by the two facing faces (c1 and c2) form a rhombic bottom plane ($A_0$-$C_1$-$B_0$-$C_2$), the common base (x) does not pass through the facing intersections ($A_0$ and $B_0$) of the rhombic bottom plane but passes through offset points ($A_2$ and $B_2$). The offset, i.e., the distance between the segment $A_0$-$B_0$ and the segment $A_2$-$B_2$ is selected appropriately within, for example, a range of from ±(2 to ±20)% of the distance between the other facing intersections (C1 and C2) of the paired retroreflective elements. As a result, the heights (hx1 and hx2) of the apices (H1 and H2) from the bottom plane (Sx-Sx') are different, the two facing lateral faces c1 ($J_1$-$J_2$-$K_2$-$K_1$-$H_1$) and c2 ($J_2$-$H_2$-$K_2$) have different shapes, and the face c1 of the retroreflective element (R1) is larger than the face c2 of the other retroreflective element (R2).

The pair of the triangular cube-corner retroreflective elements according to the present embodiment have substantially the same tilt ($\theta$) of their optical axes in directions different at 180°. The tilting direction of the optical axis (t1) in one of the paired triangular cube-corner reflective elements (R1) may be such that subtracting a distance (p1) from a distance (q1), i.e., (q1-p1), gives a negative difference, wherein the distance (q1) is a distance from [an intersection (Q1) of the optical axis (t1) and the common bottom plane (S-S')] to [a plane (Lx-Lx') perpendicular to the common bottom plane (S-S') and including the base (x) shared by the pair]; and the distance (p1) is a distance from [an intersection (P1) of the vertical from the apex (H1) of the element down to the common bottom plane (S-S') and the plane (S-S')] to [the vertical plane (Lx-Lx')] (this mode will hereinafter be referred to as a negative tilt mode of triangular retroreflective elements). Likewise, the tilting direction of the optical axis (t2) in the other element (R2), which is different in height from R1, is such that subtracting a distance (p2) from a distance (q2), i.e., (q2-p2), may give a negative difference, wherein the distance (q2) is a distance from [an intersection (Q2) of the optical axis (t2) and the common bottom plane (S-S')] to [the plane (Lx-Lx') perpendicular to the common bottom plane (S-S') and including the base (x) shared by the facing lateral faces (c1 and c2) of the pair]; and the distance (p2) is a distance from [an intersection (P2) of the vertical from the apex (H2) of the element down to the common bottom plane (S-S') and the plane (S-S')] to [the vertical plane (Lx-Lx')]. The optical axes of these elements are tilted in 180° different directions at substantially the same angle ($\theta$).

Figure 18:
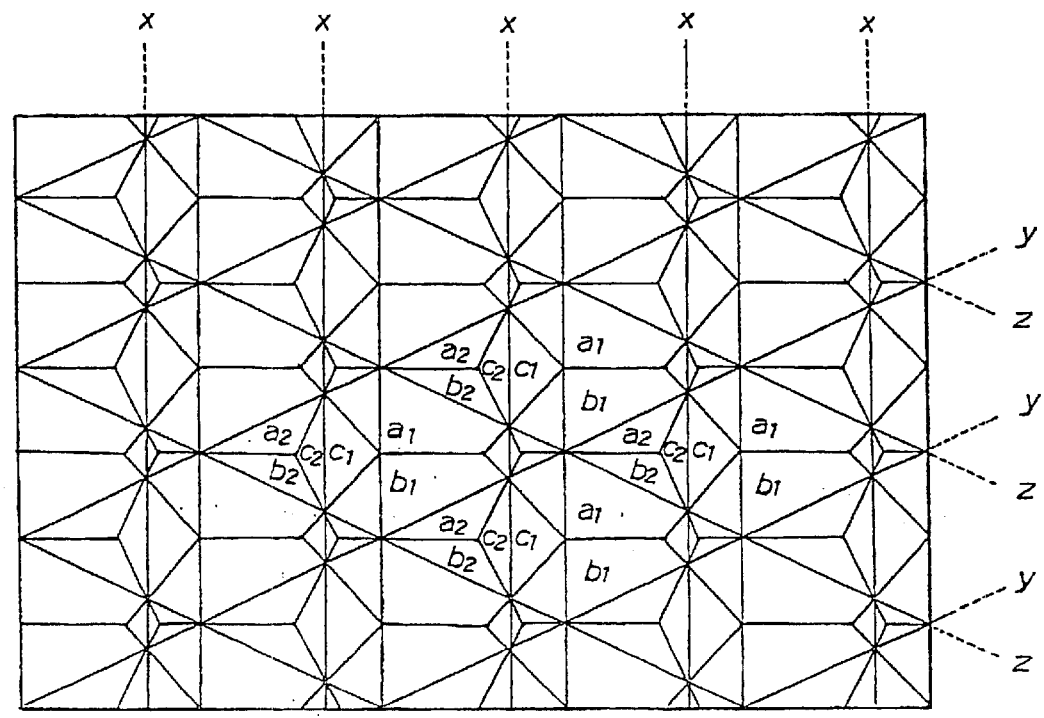
FIG. 18 is a plan view of still another example of a group of triangular cube-corner retroreflective elements used in the present invention.
Figure 19:
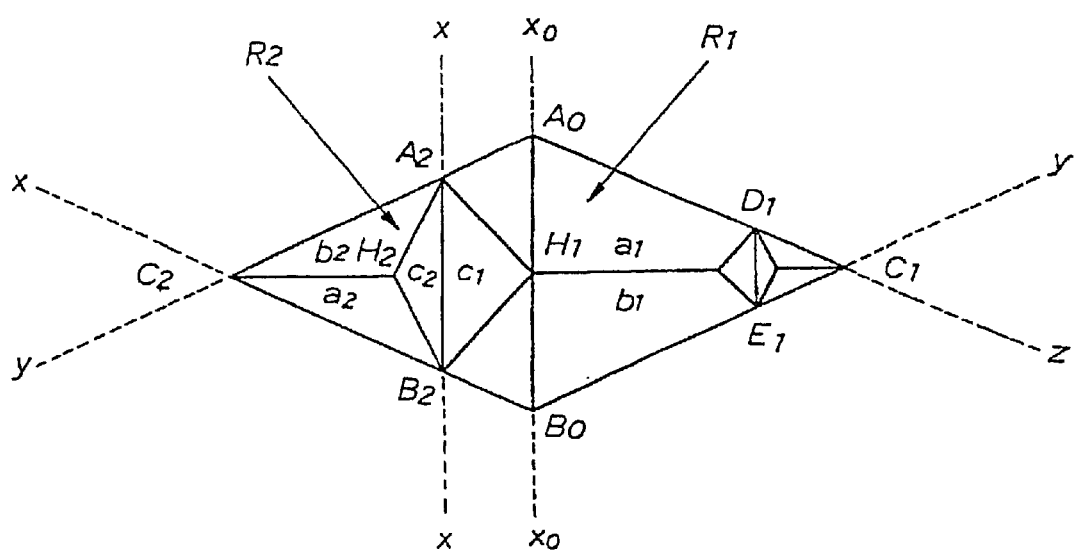
FIG. 19 is an enlarged plan view of a pair of reflective elements out of the group of triangular cube-corner retroreflective elements shown in FIG. 18.
Figure 20:
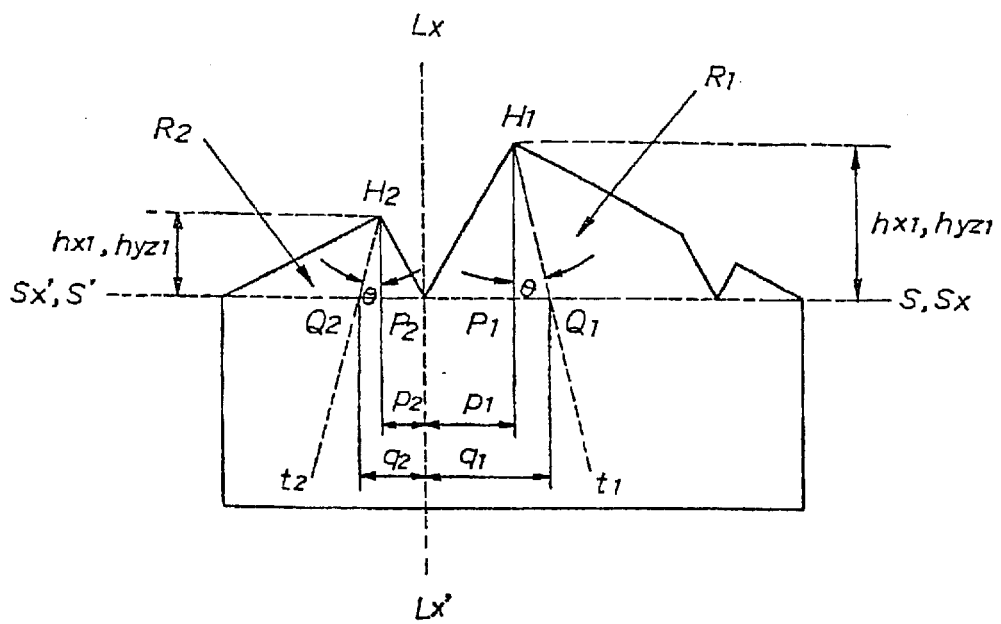
FIG. 20 is a side view of the pair of reflective elements shown in FIG. 19.

The triangular cube-corner retroreflective elements according the embodiment shown in FIGS. 18 to 20 are then described.

In the triangular cube-corner retroreflective elements according to the embodiment shown in FIGS. 18 through 20, V-shaped grooves having a substantially symmetrical cross-section intersect with each other to form pairs of triangular cube-corner retroreflective elements, each element of each pair being contoured by three lateral faces (a1, b1 and c1; a2, b2 and c2; . . . ) which intersect with each other at approximately right angles. The lateral faces (c1 and c2) which face each other in each pair have different shapes, and the elements of each pair have different heights (hx1 and hx2) from a common bottom plane (S-S') of the paired triangular retroreflective elements (R1 and R2) to their respective apices (H1 and H2).

As shown in FIG. 20, the height from a bottom plane (Sx-Sx') including the base (x) shared by facing lateral faces (c1 and c2) in a pair of the triangular retroreflective elements (R1 and R2) to the apex (H1), being taken as hx1, and the height from a bottom plane (S-S') including the bases (z, z) of one of the lateral faces (a1 and a2) and the bases (y, y) of the other lateral faces (b1 and b2) of the paired triangular retroreflective elements to the apex (H1), being taken as hyz1, are equal, and the height (hx1) from the bottom plane (Sx-Sx') to the apex (H1) is larger than the height (hx2) from the bottom plane (Sx-Sx') to the other apex (H2).

As shown in FIG. 19, in this embodiment, V-shaped grooves having a substantially symmetrical cross-section intersect with each other to form pairs of triangular cube-corner retroreflective elements, each element of each pair being contoured by three lateral faces (a1, b1 and c1; a2, b2 and c2; . . . ) which intersect with each other at approximately right angles, wherein the paired elements (R1 and R2) in each pair are substantially similar in optical geometry such that their respective optical axes make substantially the same angle ($\theta$) with the vertical in 180° different directions.

In each pair of the triangular retroreflective elements of this embodiment, while two bases (y and z) other than the common base (x) shared by the two facing lateral faces (c1 and c2) form a rhombic bottom plane ($A_0$-$C_1$-$B_0$-$C_2$), the common base (x) does not pass through the facing intersections ($A_0$ and $B_0$) of the rhombic bottom plane but passes through offset points ($A_2$ and $B_2$). The offset, i.e., the distance between the segment $A_0$-$B_0$ and the segment $A_2$-$B_2$ is selected appropriately within, for example, a range of from +(2 to 20)% of the distance between the other facing intersections ($C_1$ and $C_2$). As a result, the heights (hx1 and hx2) of the apices (H1 and H2) from the bottom plane (S-S') common to the two elements (R1 and R2) are different, and the two facing lateral faces c1 ($A_2$-$B_2$-$H_1$) and c2 ($A_2$-$H_2$-$B_2$) have different shapes and areas.

In the pair of triangular cube-corner retro-reflective elements of the embodiment shown in FIG. 19, since the V-shaped grooves making the common base (x) shared by the facing surfaces of the two elements and those making other bases (y and z) are cut to make the heights hx1 and hyz$_1$ equal, cases are met with in which the other lateral faces (a1 and b1) of the element (R1) are cut off by the V-shaped grooves (y and z) making the lateral faces (a2 and b2) of the other element (R2) thereby forming lateral faces ($A_0$-$A_2$-$H_1$) and ($B_0$-$B_2$-$H_1$) which do not contribute to retroreflection.

Further, the paired triangular cube-corner retroreflective elements according to this embodiment have their optical axes tilted at substantially the same angle ($\theta$) but in directions 180° different. The tilting direction of the optical axis (t1) in one of the paired triangular reflective elements (R1) is such that subtracting a distance (p1) from a distance (q1), i.e., (q1-p1), gives a positive difference, wherein the distance (q1) is a distance from [an intersection (Q1) of the optical axis (t1) and the common bottom plane (S-S')] to [a plane (Lx-Lx') perpendicular to the common bottom plane (S-S') and including the base (x) shared by the pair]; and the distance (p1) is a distance from [an intersection (P1) of the vertical from the apex (H1) of the element down to the common bottom plane (S-S') and the plane (S-S')] to [the vertical plane (Lx-Lx')]. Likewise, the tilting direction of the optical axis (t2) in the other element (R2), which is different in height from R1, is such that subtracting a distance (p2) from a distance (q2), i.e., (q2-p2), gives a positive difference, wherein the distance (q2) is a distance from [an intersection (Q2) of the optical axis (t2) and the common bottom plane (S-S')] to [the plane (Lx-Lx') perpendicular to the common bottom plane (S-S') and including the base (x) shared by the pair]; and the distance (p2) is a distance from [an intersection (P2) of the vertical from the apex (H2) of the element down to the common bottom plane (S-S') and the plane (S-S')] to [the vertical plane (Lx-Lx')]. The optical axes of these elements are tilted in 180° different directions at substantially the same angle ($\theta$).

Figure 21:
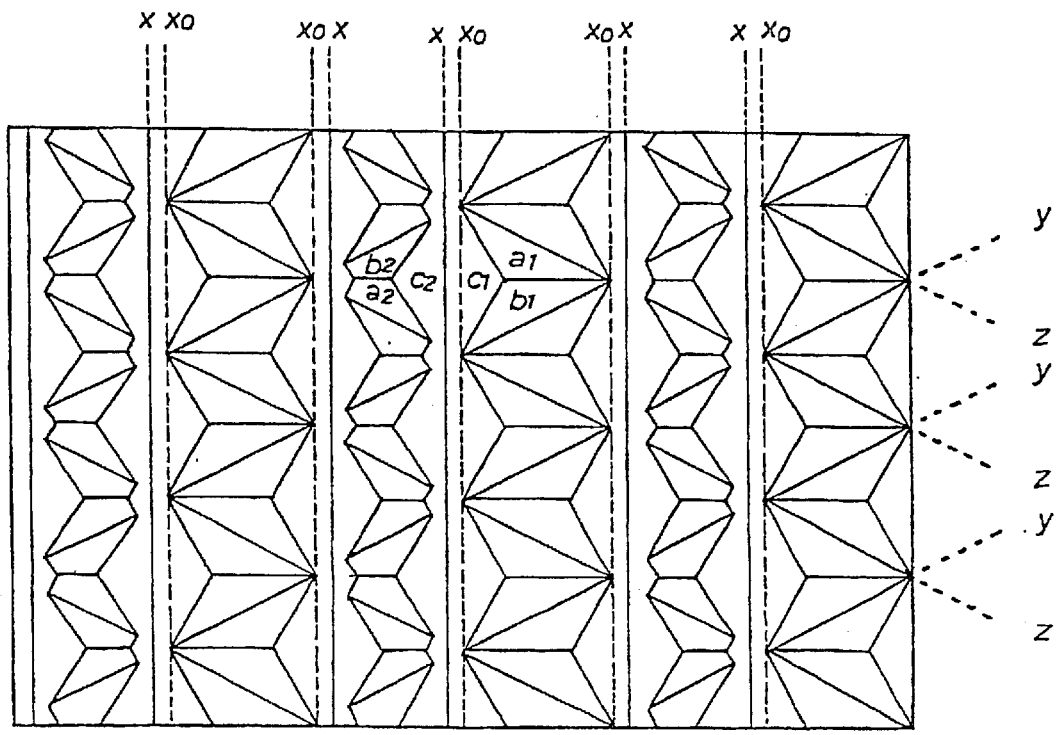
FIG. 21 is a plan view of yet another example of a group of triangular cube-corner retroreflective elements used in the present invention.

The triangular cube-corner retroreflective elements according the embodiment shown in FIG. 21 are then described.

In the triangular cube-corner retroreflective elements according to the embodiment shown in FIG. 21, too, V-shaped grooves having a substantially symmetrical cross-section intersect with each other so that pairs of triangular cube-corner retroreflective elements projecting over a common bottom plane (S-S') are arranged in a closest-packed configuration, each element of each pair being contoured by three lateral faces (a1, b1 and c1; a2, b2 and c2; . . . ) which intersect with each other at approximately right angles. The lateral faces (c1 and c2) which face each other in each pair make a pair sharing a base (x). The common bottom plane (S-S') is a common plane including both the bases (z, z) of one of the lateral faces (a1 or a2) and the bases (y, y) of the other lateral faces (b1 or b2). In the paired triangular retroreflective elements sharing the base (x), the lateral faces (c1 and c2) facing each other have different shapes, and the two apices have different heights (hx1 and hx2) from the common bottom plane (S-S').

In the triangular cube-corner retroreflective elements of the embodiment shown in FIG. 21, a large number of bases (x, x, x, . . . ) of V-shaped grooves do not agree with a large number of lines (x0, x0, x0, . . . ) passing through the facing intersections of a rhombic bottom plane formed of the other two bases (y and z) but pass through offset positions. The offset positions assigned for the bases (x, x, x, . . . ) of the V-shaped grooves are alternately at the right-hand side and the left-hand side of the respective lines (x0, x0, x0, . . . ). As a result, the number of elements with a greater height that are formed on the right side of any one of the lines (x0, x0, x0, . . . ) and the number of elements with a greater height that are formed on the left side of that line is equal. That is, the triangular cube-corner retroreflective sheeting having the above-described configuration is optically uniform in the right-to-left direction.

The details of the present invention will further be illustrated more concretely by way of Examples, but it should be understood that the present invention is not deemed to be limited thereto.

The values recited throughout the Description and Claims as well as Examples are as determined by the methods described below.

(1) Retroreflection Performance

Retroreflection performance of a retroreflective sheet 100 mm wide and 100 mm long was measured according to the test method specified in JIS Z-9117 by using Model 920 supplied by Advanced Retro Technology, Inc. as an instrument for measuring retroreflectivity. Measurement was made on appropriately selected five points of the sheet at an observation angle of 0.20 and an entrance angle of 5°, and an average value of the results was taken as retroreflection performance of the retroreflective sheet.

(2) Hue (Brightness)

The hue of a disk of a retroreflective sheet having a diameter of 50 mm was measured on appropriately selected five points with a colorimeter SE-2000 supplied by Nippon Denshoku Industries Co., Ltd. in accordance with JIS Z-9117. The colors were specified by XYZ tristimulus system. An averaged Y value was taken as a hue (brightness) of the retroreflective sheet.

(3) W-O-M Weatherability

A weathering test was carried out with a weathering tester CXW-B-812501500 available from Atlas Electric Device Company in accordance with JIS Z-9117 except that the exposure time was 3000 hours.

The results of the above measurements are shown in Table 1.

EXAMPLE 1

Preparation of Mold:

Parallel grooves having a 100 µm deep V-shaped cross-section were cut in a flat ground surface of a 100-mm square brass plate in two directions intersecting at 58.76° at a pitch of 210.88 µm in each direction in a repetitive pattern. Cutting was made by a fly-cutting technique using a diamond cutting tool having a tip angle of 68.530.

Parallel grooves having a 100 µm deep V-shaped cross-section were then cut in a third direction intersecting at an angle of 60.62° with the first and the second directions at a pitch of 214.92 µm with a diamond cutting tool having a tip angle of 71.52° thereby to form a mother matrix of the brass plate having a large number of triangular cube-corner projections having a height of 100 µm in a closest-packed configuration. The resulting triangular reflective elements had their optical axes tilted at +1°. All the interfacial angles of the three lateral faces constituting each pyramid A 1.0 mm thick mold for cube corners having inverted cavities was made of nickel by electroforming using the brass-made matrix.

Preparation of Printing Ink:

The following ink formulation was mixed by stirring in a bead mill for 5 hours to prepare white ink having a solids content of 19%. The binder used was prepared by polymerizing 99 parts by weight each of butyl acrylate, acrylic acid and vinyl acetate using a 1:1 mixed solvent of toluene and ethyl acetate and benzoyl peroxide as an initiator to a number average molecular weight of 990,000. The binder thus obtained had a solid content of 50% by weight.

| | |
|---|---|
| Ink binder | 100 parts by weight |
| Epoxidized soybean oil | 0.5 part by weight |
| Titanium oxide | 1.5 parts by weight |
| Precipitated barium sulfate | 1 part by weight |
| Antifoaming agent | 0.1 part by weight |
| Methyl ethyl ketone | 80 parts by weight |
| Toluene | 50 parts by weight |
| Ethyl acetate | 45 parts by weight |

Preparation of Printed Film:

A pattern of dots having a diameter of 2 mm arranged in zig-zag lines at a pitch of 4 mm as shown in. FIG. 4 was printed on a 70 µm thick acrylic resin film (Sunduren, available from Kaneka Corp.) by gravure printing using the above-described printing ink. The thickness of the printed areas was about 2 µm.

The printed acrylic film was superposed, with the printed side inward, on a 200 µm thick polycarbonate resin sheet (Iupilon Sheet H3000, available from Mitubishi Engineering-Plastics Corp.) and hot-pressed through a pair of laminating rolls under conditions of 200° C. and 30 kg/cm to obtain a printed laminate sheet.

Preparation of Printed Reflective Sheet:

The printed laminate sheet was compression molded by using the above-prepared mold at a molding temperature of 200° C. under a molding pressure of 50 kg/cm. After cooling to 30° C. while applying the pressure, the resin sheet was taken out to obtain a printed triangular cube-corner retroreflective sheet precursor (hereinafter simply referred to as a precursor) having on the surface thereof an about 170 µm thick holding body layer with cube corners arranged in a closest-packed configuration (not shown).

The precursor was sealed with a 38 µm thick thermoplastic polyester resin film provided on a 50 µm thick white polyethylene terephthalate film by use of a sealing mold having a projecting honeycomb structure.

A 60 µm thick layer of an acrylic pressure-sensitive adhesive (Nissetsu KP1818, available from Nippon Carbide Industries, Co., Inc.) and a 100 µm thick polypropylene release sheet (available from Okura Industrial Co., Ltd.) were superposed thereon to prepare a triangular cube-corner retroreflective sheet having a printed layer as shown in FIG. 1.

EXAMPLE 2

The precursor prepared in Example 1 was set in a vacuum deposition system having a vacuum chamber capable of maintaining a vacuum degree of $9 \times 10^{-4}$ mmHg and a heating unit capable of melting aluminum in a graphite crucible in the vacuum chamber by an electric heater. Pure aluminum pellets having a purity of 99.99% or higher and particulate metallic titanium were put in the graphite crucible at a weight ratio of 100:1, and vaporized and deposited on the three slant surfaces of the triangular cube-corner reflective elements at an alternating voltage of 350 V and a current of 115 to 120 Å for a batch treating time of 5 minutes, thereby to form an aluminum deposit layer having a thickness of 1100 Å as a mirror-reflection layer.

A pressure-sensitive adhesive layer and a release sheet were superposed on the vapor-deposited side of the vapor-deposited stock sheeting in the same manner as in Example 1 to prepare a vapor-deposited triangular cube-corner retroreflective sheet having a printed layer.

EXAMPLE 3

A 70 μm thick acrylic resin film (Sunduren, available from Kaneka Corp.) and a 200 μm thick polycarbonate resin sheet (Iupilon Sheet H3000, available from Mitubishi Engineering-Plastics Corp.) were hot-pressed through a pair of laminating rolls under conditions of 200° C. and 30 kg/cm to obtain a laminate sheet.

A pattern of dots having a diameter of 1 mm arranged in zig-zag lines at a pitch of 3 mm as shown in FIG. 4 was formed on the polycarbonate side of the laminate sheet by gravure printing with the printing ink prepared in Example 1. The thickness of the printed areas was about 2 μm.

The printed laminate sheet was compression molded with its printed side in contact with the mold under the same conditions as in Example 1.

A sealed structure and an adhesive layer were introduced in the same manner as in Example 1 to prepare a vapor-deposited triangular cube-corner retroreflective sheet in which the prism reflective surface was partly printed in white.

COMPARATIVE EXAMPLE 1

Figure 6:
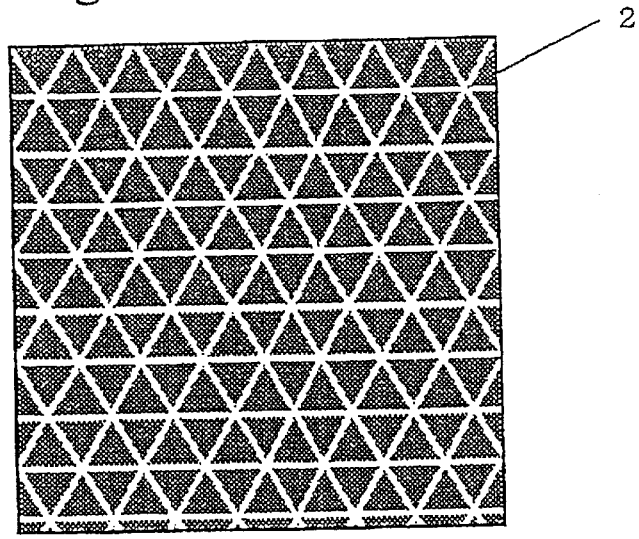
FIG. 6 is a plan view showing an example of a conventionally used printed layer having a continuous printed area.
Figure 7:
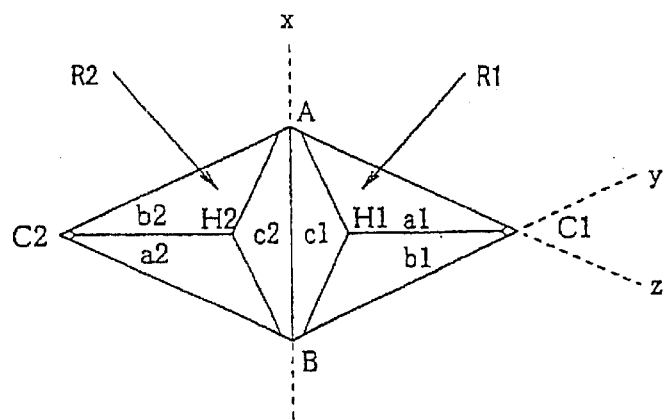
FIG. 7 is a plan view of an example of a pair of triangular cube-corner retroreflective elements used in the present invention.
Figure 8:
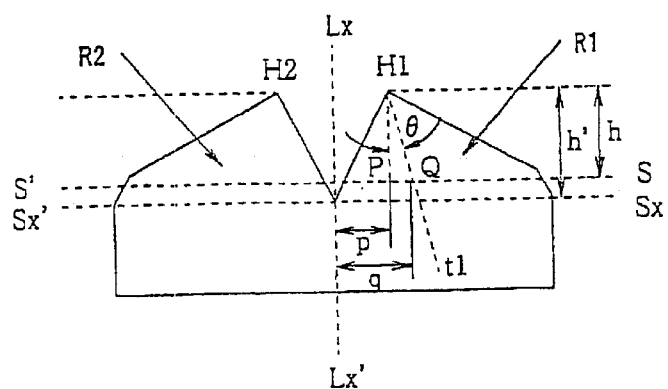
FIG. 8 is a side view of the pair of reflective elements shown in FIG. 7.
Figure 9:
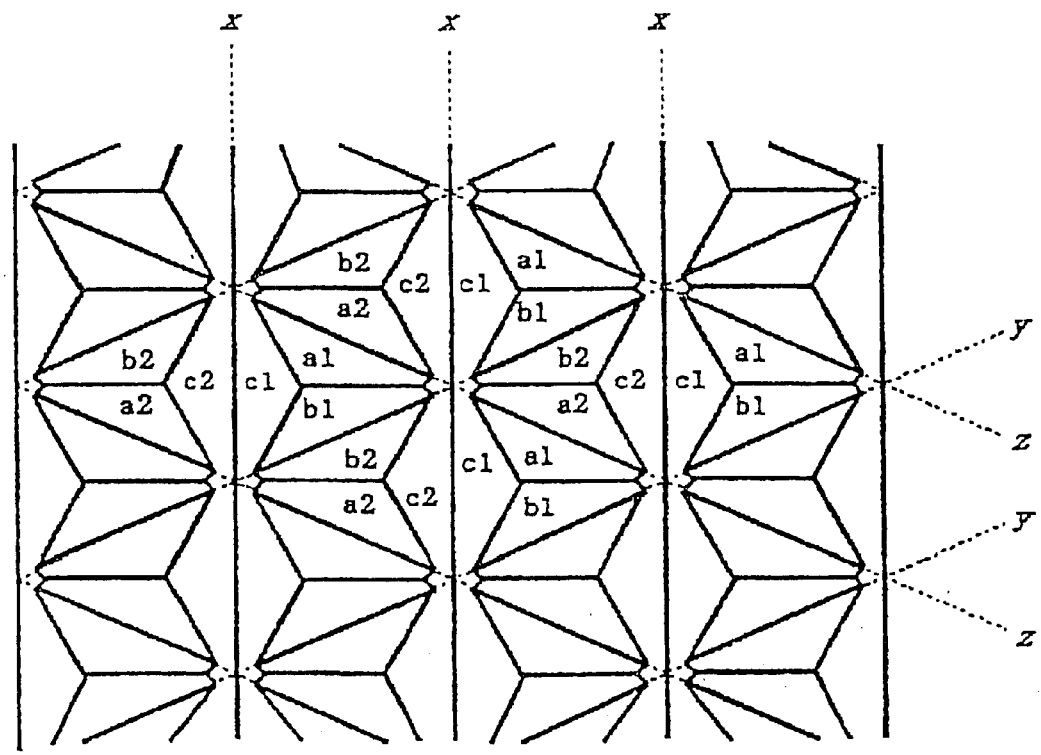
FIG. 9 is a plan view of a group of triangular cube-corner retroreflective elements made up of the pairs of reflective elements shown in FIG. 7.
Figure 10:
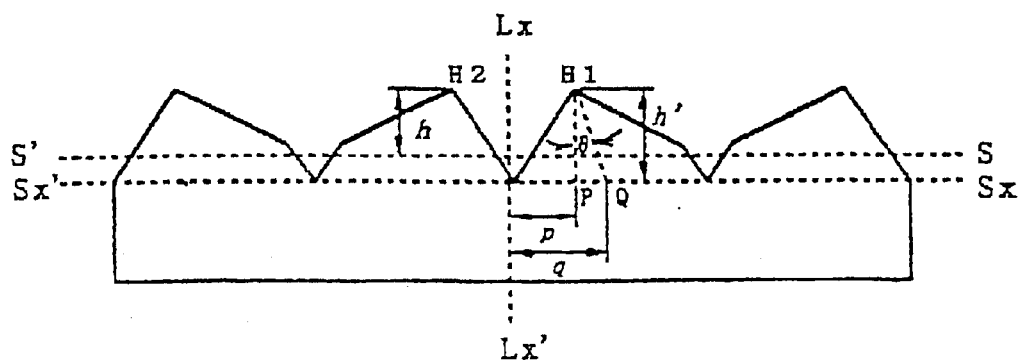
FIG. 10 is a side view of the group of triangular cube-corner retroreflective elements shown in FIG. 9.

A triangular cube-corner retroreflective sheet having a printed layer was prepared in the same manner as in Example 1, except that the printed layer had the pattern shown in FIG. 6.

COMPARATIVE EXAMPLE 2

A triangular cube-corner retroreflective sheet having a printed layer was prepared in the same manner as in Example 2, except that the printed layer had the pattern shown in FIG. 6.

TABLE 1

|  | Example 1 | Example 2 | Example 3 | Comparative Example 1 | Comparative Example 2 |
|---|---|---|---|---|---|
| Retroreflection Performance | 430 | 615 | 512 | 457 | 534 |
| Hue (Y Value) | 46 | 28 | 25 | 48 | 28 |
| Appearance after Weathering Test | nothing abnormal | nothing abnormal | nothing abnormal | lifting of printed parts | lifting of printed parts |

Industrial Applicability

The retroreflective sheeting according to the present invention has excellent resistance to weather and water and an improved hue and is particularly useful for signs such as road signs and construction signs; license plates of vehicles such as automobiles and motorcycles; safety equipment such as garments and lifesaving equipment; markings of signboards; and reflectors such as visible light, laser light or infrared light reflective sensors; and the like.

What is claimed is:

1. Retroreflective sheeting having a printed layer which comprises at least a reflective element layer made up of a large number of reflective elements and a holding body layer and a surface protective layer provided on said reflective element layer, wherein said printed layer is formed of a discrete repetitive pattern of unit patterns, and said unit patterns each have an area of 0.15 mm$^2$ to 30 mm$^2$.

2. The retroreflective sheeting according to claim 1, wherein said reflective elements are triangular cube-corner retroreflective elements.

3. The retroreflective sheeting according to claim 2, wherein said triangular cube-corner retroreflective elements have a vapor-deposited layer on the lateral faces thereof.

4. The retroreflective sheeting according to claim 2, which is characterized in that a said triangular cube-corner retroreflective elements are pairs of triangular cube-corner retroreflective elements formed by V-shaped grooves having a substantially symmetrical cross-section and intersecting with each other so that the pairs project over a common bottom plane (S-S') and are arranged in a closest-packed configuration and that each element of each pair is contoured by three lateral faces (a1, b1 and c1; a2, b2 and c2; . . . ) which intersect with each other at approximately right angles, p1 two lateral faces facing each other (c1 and c2) in each pair make a pair sharing a base (x), said bottom plane (S-S') is a common plane including both the base (z, z) of one of the other lateral faces (a1 or a2) and the base (y, y) of the other lateral faces (b1 or b2), said lateral faces (c1 and c2) facing each other and having the common base (x) in each pair have different shapes, and the elements of each pair have different heights from said bottom plane (S-S') to their respective apices.

5. The retroreflective sheeting according to claim 2, wherein pairs of triangular cube-corner retroreflective elements projecting over a common bottom plane (Sx-Sx') are arranged in a closest-packed configuration, each pair sharing a base on said common bottom plane (Sx-Sx'), said bottom plane (Sx-Sx') is a common plane including a large number of bases (x, x, . . . ) each shared by each pair of triangular reflective elements, the elements facing each other to make a pair have substantially the same contour and are substantially symmetrical about a plane (Lx-Lx', Lx-Lx', . . . ) perpendicular to said bottom plane (Sx-Sx'), each pair of the triangular reflective elements are formed of slant lateral faces (c1 and c2) which have substantially the same pentagonal shape and share said common base (x, x, . . . ) as one side of said pentagonal shape and slant lateral faces (a1 and b1) and (a2 and b2) which have substantially the same quadrilateral shape each formed of one of the upper two sides of the face c1 or c2 including the apex (H1 or H2) of each triangular reflective element, share one lateral edge of each element as another side, and intersect with the face c1 or c2 at substantially right angles, and the height (h') from the apex (H1 or H2) of every triangular reflective element to said bottom plane (Sx-Sx') including the bases (x, x, . . . ) of the pentagonal slant faces (c1 and c2) is substantially larger than the height (h) from the apex (H1 or H2) of every triangular reflective element to a substantially horizontal plane (imaginary plane; S-S') including the bases (y and z) of the other slant faces (a1 and b1) and (a2 and b2).

6. The retroreflective sheeting according to claim 3, which is characterized in that said triangular cube-corner retroreflective elements are pairs of triangular cube-corner retroreflective elements formed by V-shaped grooves having a substantially symmetrical cross-section and intersecting with each other so that the pairs project over a common bottom plane (S-S') and are arranged in a closest-packed configuration and that each element of each pair is contoured by three lateral faces (a1, b1 and c1; a2, b2 and c2; . . . . ) which intersect with each other at approximately right angles, two lateral faces facing each other (c1 and c2) in each pair make a pair sharing a base (x), said bottom plane (S-S') is a common plane including both the base (z, z) of one of the other lateral faces (a1 or a2) and the base (y, y) of the other lateral faces (b1 or b2), p1 said lateral faces (c1 and c2) facing each other and having the common base (x) in each pair have different shapes, and the elements of each pair have different heights from said bottom plane (S-S') to their respective apices.

7. The retroreflective sheeting according to claim 3, wherein pairs of triangular cube-corner retroreflective elements projecting over a common bottom plane (Sx-Sx') are arranged in a closest-packed configuration, each pair sharing a base on said common bottom plane (Sx-Sx'), said bottom plane (Sx-Sx') is a common plane including a large number of bases (x, x, . . . ) each shared by each pair of triangular reflective elements, the elements facing each other to make a pair have substantially the same contour and are substantially symmetrical about a plane (Lx-Lx', Lx-Lx', . . . ) perpendicular to said bottom plane (Sx-Sx'), each pair of the triangular reflective elements are formed of slant lateral faces (c1 and c2) which have substantially the same pentagonal shape and share said common base (x, x, . . . ) as one side of said pentagonal shape and slant lateral faces (a1 and b1) and (a2 and b2) which have substantially the same quadrilateral shape each formed of one of the upper two sides of the face c1 or c2 including the apex (H1 or H2) of each triangular reflective element, share one lateral edge of each element as another side, and intersect with the face c1 or c2 at substantially right angles, and the height (h') from the apex (H1 or H2) of every triangular reflective element to said bottom plane (Sx-Sx') including the bases (x, x, . . . ) of the pentagonal slant faces (c1 and c2) is substantially larger than the height (h) from the apex (H1 or H2) of every triangular reflective element to a substantially horizontal plane (imaginary plane; S-S') including the bases (y and z) of the other slant faces (a1 and b1) and(a2 and b2).

8. The retroreflective sheeting according to claim 1, wherein said printed layer is provided on the lateral faces of said reflective elements.

9. The retroreflective sheeting according to claim 1, wherein said printed layer is provided between said holding body layer and said surface protective layer.

10. The retroreflective sheeting according to claim 1, wherein said printed layer is provided on said surface protective layer.

* * * * *